United States Patent Office

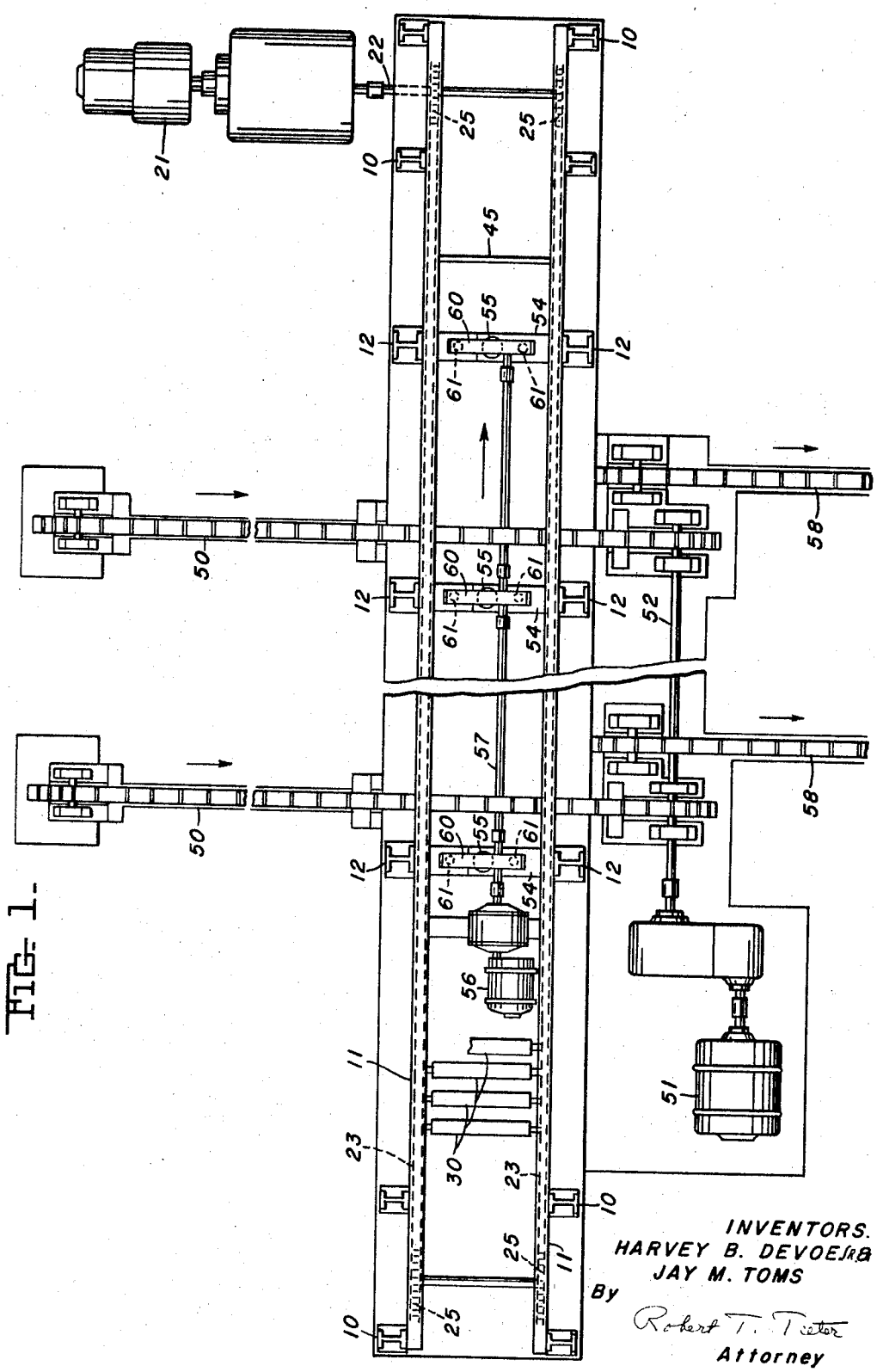

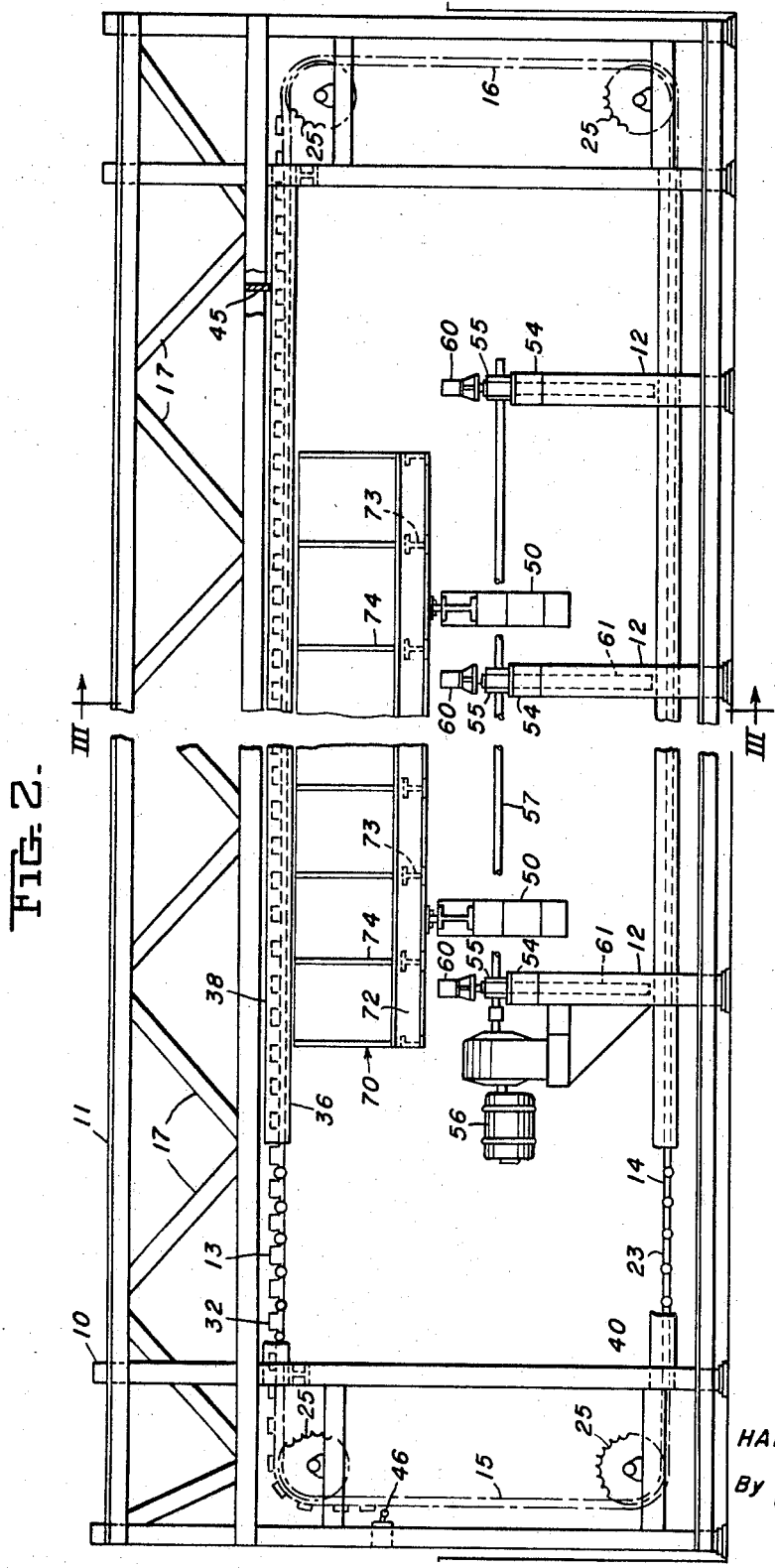

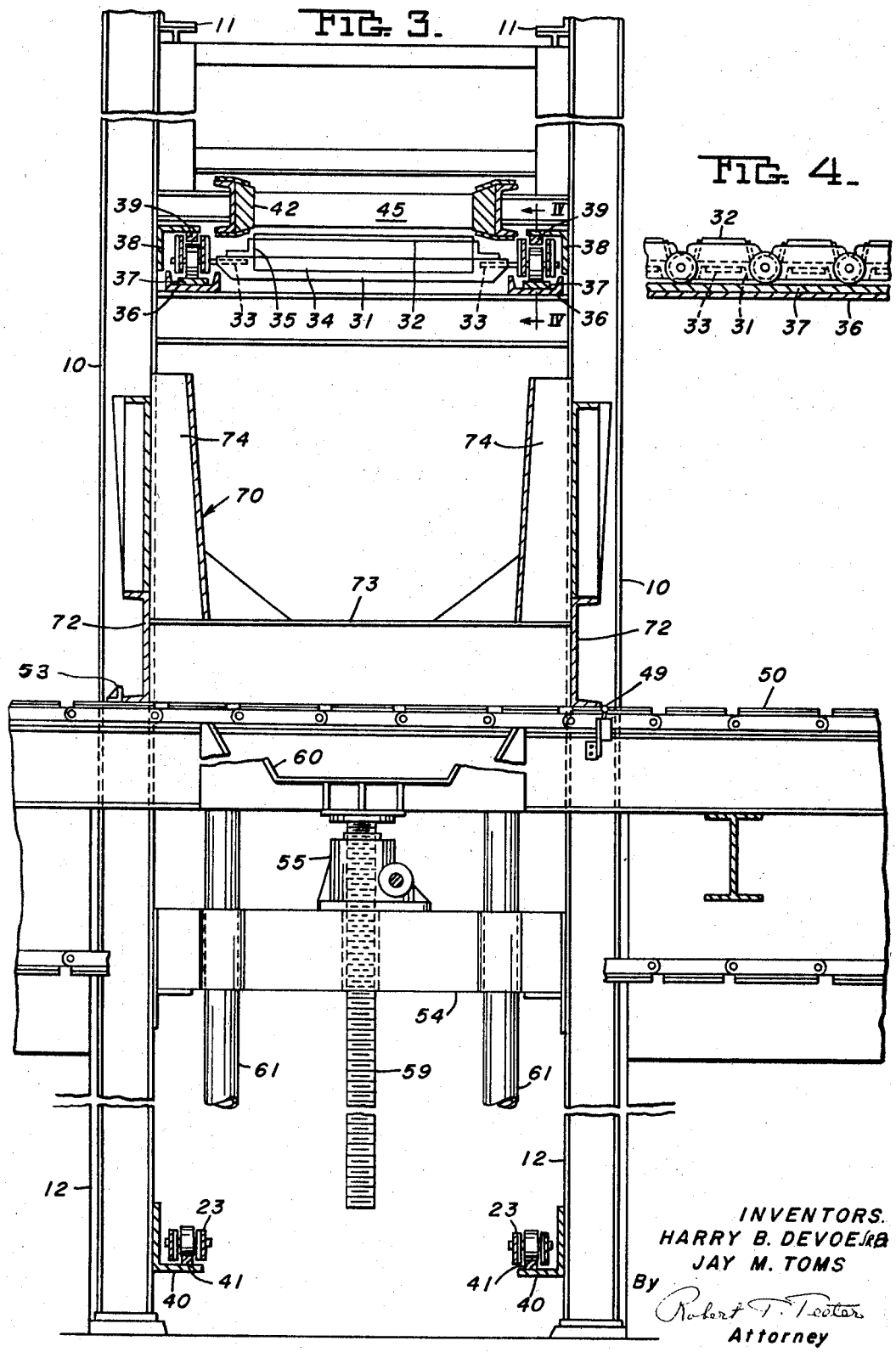

3,425,570
Patented Feb. 4, 1969

3,425,570
APPARATUS FOR HANDLING ELONGATED SHAPES
Harvey B. De Voe, Jr., and Jay M. Toms, Massena, N.Y., assignors to Aluminum Company of America, Pittsburgh, Pa., a corporation of Pennsylvania
Filed Sept. 20, 1966, Ser. No. 580,643
U.S. Cl. 214—6                                        1 Claim
Int. Cl. B65g 57/14

ABSTRACT OF THE DISCLOSURE

Elongated shapes such as extrusions can be transferred between operations by means of a conveyor which has supporting members over only a portion of its length so that when an elongated shape carried on this conveyor abutts against a stop, the supporting members will progressively slide from under the shape and it will descend from the conveyor to a receiving means positioned thereunder. This apparatus may also include means for raising and lowering the receiving means, and means for transferring the shapes laterally from under the conveyor.

---

This invention relates to apparatus for handling elongated shapes, and more particularly to apparatus for handling elongated shapes having small cross-sectional dimensions relative to their lengths and thus easily deformed.

One of the troublesome problems associated with the handling of elongated shapes such as extrusions and tubing is that of deforming and marking the shapes in transferring them between fabricating operations. An extrusion, for example, is hot as it emerges from the die and is easily dented, bowed, and scratched. It is, therefore, desirable to limit, as much as possible, the handling of the extrusion before it has cooled, and to conduct the handling that is necessary in such a manner as not to damage the extrusion.

Accordingly, a general object of this invention is to provide equipment for handling elongated shapes having relatively small cross-sections. Another object of the invention is to provide handling equipment for transferring extrusions between operations or between an extrusion press and a storage rack or the like. A further object of the invention is to provide extrusion handling equipment for loading extrusions into a storage rack with a minimum of marking and deformation of the extrusions.

These and other objects and advantages will become apparent from the following description and accompanying drawings wherein:

FIGURE 1 is a plan view illustrating extrusion handling equipment constructed in accordance with the invention;

FIGURE 2 is a side elevation view of the equipment in FIGURE 1 (omitting a portion of the conveyor equipment in the foreground);

FIGURE 3 is an enlarged cross-sectional view taken on lines III—III on FIGURE 2;

FIGURE 4 is a cross-sectional view taken on lines IV—IV of FIGURE 3.

In accordance with the invention, a primary conveyor initially receives an elongated shape or workpiece proceeding from the antecedent equipment, such as an extrusion press or runout table. The conveyor may be comprised of at least two laterally spaced, parallel, continuous members such as chains and workpiece supporting means spanning the interspace between, and attached to, the continuous members over a portion of their length.

The primary conveyor has a substantially horizontal upper flight and a lower flight spaced a substantial distance below it so that auxiliary apparatus may be positioned between the flights. The upper flight is longer than the longest workpiece to be handled so that the full length of the workpiece can be supported on this flight.

With workpiece supporting means attached to the continuous conveyor members, and spanning the interspace between these members throughout a portion of their length, the interspace left along the remaining length of the continuous conveyor members is open. In the preferred embodiment of our invention, the supporting length of the conveyor, i.e. the portion having supporting means attached between the members, is approximately the same length as the maximum length of the workpiece to be handled. Similarly, the non-supporting length will usually be at least as long. Further, the conveyor will usually have only one supporting portion and one non-supporting portion, but it may have multiple supporting portions, each separated by a non-supporting portion.

Means are provided for moving the conveyor, and desirably a stop is provided for arresting the travel of a workpiece or workpieces carried and supported on the upper flight of the moving conveyor. In operation, the forward end of a workpiece will be introduced onto the supporting length of the moving conveyor as this supporting length moves into and along the upper flight of the conveyor. As the supporting length moves, the workpiece will be carried onto and along the upper flight until its full length is supported. Thereafter, the forward end of the workpiece will abut against a stop which will arrest its travel as the conveyor continues to run. Consequently, the supporting length of the conveyor will progressively slide from under the workpiece as the conveyor moves. The non-supporting length traveling into position will, of course, not support the workpiece, so the workpiece will descend between the spaced continuous members onto a receiving means that has been positioned below the upper flight. The receiving means is desirably about the same length as the workpiece and is aligned parallel to the upper flight. Since the supporting length of the conveyor slides progressively from under the elongated workpiece, and since the receiving means may be located only a few inches below the upper flight, the deposit of the workpiece may be gradual and gentle.

In the preferred embodiment of the invention, a receiving means adapted to be raised and lowered is disposed in the free space between conveyor flights. The receiving means can be initially raised through slots in a loading rack to a position immediately below the upper flight so as to minimize the distance the workpieces first received will descend or fall into the receiving means. As successive workpieces are deposited in the receiving means, the latter can be progressively lowered to avoid interference between the load and the conveyor and still minimize the workpiece drop. When the receiving means has been fully lowered, the accumulated workpieces will have been deposited in the loading rack.

As shown in the drawings, a preferred embodiment of extrusion handling equipment constructed in accordance with the invention has a primary conveyor, the upper flight 13 of which receives an extrusion from the antecedent extrusion handling apparatus such as an extrusion press or runout table. A stop 45 is provided for arresting the longitudinal travel of the extrusion carried by the primary conveyor. A plurality of trays 60 are provided for receiving extrusions from the conveyor and a plurality of jacks 55 are provided for raising and lowering the trays 60. A loading rack 70 (shown in FIGURES 2 and 3) receives extrusions from the trays 60, and a plurality of rack conveyors 50 move the loading rack 70 laterally into and out of loading position. Since the primary conveyor may be very long, FIGURES 1 and 2 are broken in the middle for simplicity in illustrating the apparatus. Means are also provided for moving the conveyors and for raising and lowering the jacks together with limit switches for controlling the movement of the conveyors.

The primary conveyor is mounted on a structural frame comprised of vertical supports 10, intermediate vertical supports 12, and longitudinal beams 11 attached to the vertical supports 10. Diagonal braces 17, together with suitable transverse and cross braces, may be provided. In the preferred embodiment, the conveyor is comprised of two endless chains 23 with extrusion supporting members 30 (only some of which are shown in FIGURE 2) attached at spaced locations across the interspace between chains. The extrusion supporting members 30 are attached to the chains, however, only over approximately one-half of the conveyor length, with the interspace between the chains 23 being open for the remaining length of the conveyor. As seen in FIGURE 2, the conveyor has a substantially horizontal upper flight 13, and a lower flight 14 spaced a substantial distance below it. An ascending flight 15 and a descending flight 16 interconnect the upper and lower flights. The primary conveyor thus surrounds a free rectangular space in which the means for receiving extrusions from the conveyor may be positioned. The conveyor is powered by a motor 21, acting through drive shaft 22 to rotate two of the sprockets 25.

As seen in FIGURES 3 and 4, the extrusion supporting members are comprised of a channel 31, a nonabrasive liner 32 of carbon or graphite, two retaining skirt members 34 overlapping the liner 32 and the leg of the channel 31, and two end pieces 35 for retaining the liner 32 between the skirt members 34. Each support member is suitably secured at its ends to the chains through an adaptor 33.

In order to prevent sagging of the chains along the upper flight 13, chain supports and guides are provided. As shown in FIGURES 2 and 3, cross beams extend between and are secured to vertical supports 10, with two upper chain supports 36 mounted on such beams. Lower chain supports 40 are also shown in FIGURES 2 and 3, secured to the vertical supports 10 and intermediate supports 12. Upper wear strips 37 and lower wear strips 41 are suitably secured to the chain supports 36 and 40.

FIGURE 3 further shows chain guides 38 attached to the vertical supports 10. These guides 38 correspond to the chain supports 36, extending for the length of the conveyor and have chain guide wear strips 39 secured to them as shown in FIGURE 3.

FIGURE 3 further illustrates extrusion guide members 42 disposed upwardly of, and on each side of, the upper flight. These guides 42 are constructed similarly to the extrusion support members and are suitably attached to vertical supports 10. As their name suggests, the extrusion guide members 42 guide the extrusions so that they will not fall off the conveyor.

A stop 45 is suitably attached, between longitudinal beams 11, near the end of the upper flight, and it is designed to arrest the longitudinal travel of an extrusion carried on the upper flight 13 of the conveyor. In accordance with the invention, this stop 45 is disposed just above the upper flight 13, so that it will not interfere, but be close enough so that the end of even the smallest extrusion carried by the flight will abut against the stop 45. As shown in FIGURE 2, a limit switch actuator is positioned at the ascending end of the upper flight, to automatically stop the conveyor when the first extrusion supporting member 30 hits the switch actuator before the supporting length starts across the upper flight.

The trays 60 for receiving extrusions from the unloading table are carried by the vertically movable jacks 55 mounted on beams 54 carried by intermediate supports 12. The trays 60 are approximately the same width as the conveyor and, as shown in FIGURE 1, each jack screw 59 carries one tray 60. The jacks 55 may be operated by means of motor 56 acting through drive shaft 57 to raise and lower the trays 60 from the highest position, with the trays a few inches below the upper flight, to their bottom position, with the trays just below the level of the rack conveyors 50. Two tray guides 61, attached to the bottom of each tray 60, are disposed through holes in the jack support 54 to locate and prevent rotation of the trays 60. It is, of course, desirable that the jack screws 59 and tray guides 61, when the jack 55 is in its bottommost position, have clearance between their bottom ends and the lower flight 14 of the primary conveyor.

As shown in FIGURES 2 and 3, a loading rack 70 for receiving extrusions from the trays 60, is carried on crossfeed rack conveyors 50. The rack 70 is approximately the same length as, and is aligned with, the primary conveyor. As shown in FIGURE 3 the rack 70 is constructed of two long, parallel channels 72 as base members, with intermediate cross-members 73 and side members 74 secured to the channels 72 at successive positions along their length. Preferably the channels 72, or other longitudinal base members, are spaced further apart than the width of the trays 60. Also, the cross-members 73 and side members 74 are so spaced along the length of the channel 72 that they do not coincide with the positions of the jacks 55 and trays 60. This permits the trays 60 to be raised and lowered through the rack 70, i.e. between the channel 72 and intermediate the cross members 73 and side members 74.

The conveyors 50 for carrying the rack 70 run lateral to the primary conveyor and are powered by motor 51 acting through drive shaft 52. These conveyors 50 are provided with pushers 53 (FIGURE 3) for pushing the rack 70 and restraining it from sliding or twisting on the conveyors 50. A limit switch 49 is located on one of the intermediate supports 12 and so positioned that when the auxiliary conveyor 50 transfers an empty rack 70 into position under the primary conveyor 20, the rack 70 will strike the switch actuator and stop the conveyors 50 with rack 70 in the proper position directly under the upper flight 13.

In operation of the apparatus described, a rack 70 will be positioned on the loading ends of the rack conveyors 50 to be transferred into position under the primary conveyor. The rack 70 will be aligned with the primary conveyor and thus extend across the rack conveyors 50 with pushers 53 engaging the rack 70 as shown in FIGURE 3. When the rack conveyors 50 are started, the rack 70 will travel laterally to a position directly under the upper flight 13 of the primary conveyor. At this point, the rack 70 will strike the actuator of switch 49 to stop the travel of the rack conveyors 50. The jacks 55 and trays 60 positioned thereon will then be raised through the rack 70 to a position a few inches below the upper flight 13 of the primary conveyor. The trays 60 will then be in position to receive extrusions.

The primary conveyor, having been automatically stopped with the first supporting member 30 of the supporting length positioned at the charging end of the upper flight 13 after unloading the last extrusion, will be started as the end of a new extrusion is introduced onto the charging end of the upper flight 13. Preferably, the linear velocity of the primary conveyor is approximately the same as the velocity of the extrusion issuing from the extrusion die or runout table. This minimizes relative motion between the extrusion and extrusion supporting members 30 and thus reduces the possibility of scratching the extrusion.

Upon starting the primary conveyor, its supporting length will move across the upper flight 13, carrying the extrusion with it. The full length of the extrusion will be conveyed to a position of being fully extended and supported upon the upper flight 13. At this point, the forward end of the extrusion will abut against stop 45 which arrests the travel of the extrusion. Meanwhile, the conveyor continues to run and progressively slides the supporting members 30 from under the extrusion.

As the last supporting member 30 in the supporting length progressively slides from under the extrusion, the extrusion will progressively descend into the trays 60 positioned below the conveyor's upper flight. This descent of the extrusion into the trays 60 will proceed with the trailing end of the extrusion first dropping into a tray 60 as the last supporting member 30 slides from under the center of balance of the extrusion. Then the remainder of the extrusion will progressively drop into the trays 60 as the last supporting member 30 slides from under the forward end of the extrusion. As can be seen, this unloading of the extrusion from the conveyor into the trays 60 may be quite gentle, and the extrusion is not likely to be damaged by the unloading.

As successive extrusions are received by the trays 60, the jacks 55 and trays 60 are progressively lowered by means of motor 56 to leave clearance between the accumulated extrusions in the trays 60 and the upper flight 13.

The trays 60 are progressively loaded and lowered until they ultimately reach their bottom-most position below the rack 70, and the extrusions will thus remain deposited in the rack 70. The rack conveyors 50 and the auxiliary outfeed conveyors 58 (FIGURE 1) will then be started and will carry the loaded rack 70 from under the primary conveyor. The rack 70 can then be removed from the auxiliary conveyors by hand or other handling apparatus. An empty rack 70 can be positioned on the loading ends of the auxiliary conveyors 50 for a subsequent loading cycle.

From the above description, it is apparent that apparatus for handling elongated shapes has been provided that will greatly reduce damage to workpieces handled thereon. While a presently preferred embodiment of the apparatus has been described and illustrated, it will be recognized that the invention can be otherwise practiced and embodied within the scope of the following claim.

What is claimed is:
1. In a machine for handling elongated shapes,
 (a) a conveyor for carrying an elongated shape and compising at least two laterally spaced, parallel, continuous members, together with a plurality of shape supporting members connecting the same and spanning the interspace therebetween throughout a portion of the length thereof corresponding to the length of said elongated shape to be supported thereon, another portion of said interspace along the length of said continuous members remaining open to permit descent therebetween of said elongated shape, said conveyor having an elongated substantially horizontal upper flight for receiving and carrying said elongated shape, said upper flight being longer than said shape to be carried thereon, and a lower flight spaced a substantial distance therebelow;
 (b) means for moving said conveyor;
 (c) a stop for arresting the travel of an elongated shape carried on said upper flight of said conveyor so that said supporting members will progressively slide from under said elongated shape, permitting the same to descend between said continuous members upon continued motion thereof;
 (d) tray means for receiving an elongated shape progressively descending from said upper flight, said tray means being disposed below and aligned with said upper flight;
 (e) means for raising said tray means to position the same immediately below said upper flight to minimize the distance that an elongated shape will progressively drop in its descent from said upper flight to said tray means, said tray means being adapted to be progressively lowered as successive elongated shapes are accumulated thereon;
 (f) a rack for receiving the accumulated elongated shapes deposited thereon from said tray means, said rack being interposed between said upper flight and said lower flight below the raised position of said tray means, and having slots therethrough for passage of said tray means; and
 (g) conveyor means for transferring said rack into and out of position under said upper flight.

References Cited
UNITED STATES PATENTS

| | | | |
|---|---|---|---|
| 2,000,273 | 5/1935 | Conklin et al. | 214—6 |
| 2,593,343 | 4/1952 | Rayburn et al. | 214—6 |
| 2,701,650 | 2/1955 | Stevenson | 214—6 |
| 2,815,870 | 12/1957 | Laub | 214—6 |
| 2,323,174 | 6/1943 | Wikle | 214—6 X |
| 2,765,599 | 10/1956 | Johnson | 214—6 X |
| 3,241,689 | 3/1966 | Verrinder | 214—6 |
| 3,346,128 | 10/1967 | Hullhorst | 214—6 |

FOREIGN PATENTS
1,288,044 2/1962 France.

GERALD M. FORLENZA, *Primary Examiner.*
R. J. SPAR, *Assistant Examiner.*